United States Patent [19]
Becker et al.

[11] Patent Number: 5,855,052
[45] Date of Patent: Jan. 5, 1999

[54] FASTENER INSTALLATION DEVICE

[75] Inventors: Robert O. Becker; Charles R. Nelson, Jr., both of Florissant, Mo.

[73] Assignee: McDonnell Douglas Corporation, St. Louis, Mo.

[21] Appl. No.: 844,220

[22] Filed: Apr. 18, 1997

[51] Int. Cl.[6] .................... B23Q 3/00; B21J 15/02
[52] U.S. Cl. ............... 29/464; 29/464; 29/525.06; 29/243.519; 411/353
[58] Field of Search ................ 29/281.1, 281.5, 29/464, 243.519, 525.06; 408/72 R

[56] References Cited

U.S. PATENT DOCUMENTS

| | | | |
|---|---|---|---|
| 873,640 | 12/1907 | Waddington | 29/281.1 |
| 1,237,143 | 8/1917 | Allen | 408/72 R |
| 2,647,252 | 3/1953 | Nolin et al. | 29/281.5 |
| 2,931,532 | 4/1960 | Gapp | 29/525.06 |
| 2,995,266 | 8/1961 | Crawford | 29/243.519 |
| 3,294,140 | 12/1966 | Cosenza | 151/13 |
| 4,324,517 | 4/1982 | Dey | 411/353 |
| 4,464,090 | 8/1984 | Duran | 411/103 |
| 4,555,838 | 12/1985 | Muller | 29/243.519 |
| 4,579,491 | 4/1986 | Kull | 411/43 |
| 4,692,075 | 9/1987 | Metz | 411/7 |
| 4,729,163 | 3/1988 | Muller et al. | 29/243.519 |
| 4,807,498 | 2/1989 | Kleiser et al. | 81/56 |
| 4,865,500 | 9/1989 | Duran et al. | 411/103 |
| 5,137,406 | 8/1992 | Cosenza | 411/113 |
| 5,399,053 | 3/1995 | Duran | 411/353 |

*Primary Examiner*—Paul T. Sewell
*Assistant Examiner*—Jila Mohandesi
*Attorney, Agent, or Firm*—Senniger, Powers, Leavitt & Roedel

[57] ABSTRACT

A jig for use in attaching a first part of a fastener assembly to a structural frame member having a fastener opening and at least one connector hole adjacent the fastener opening. The fastener assembly is of the type used for removably connecting a panel to the structural member. The first fastener part comprises a holder and a threaded stud retained in the holder. The holder has a flange having at least one opening formed therein and is adapted for permanent attachment to the structural member by a connector extending through the connector hole of the structural member and the opening in the holder. The jig comprises a body having a rotatable member with a head rotatably mounted in the body and a shank. The shank has threads matingly engageable with the threads on the stud of the first fastener part. The body is adapted to be positioned with the shank of the rotatable member extending through the fastener opening in the structural member for threaded engagement with the threaded stud of the first fastener part whereby rotation of the rotatable member pulls the holder into tight engagement with the structural member to hold the first fastener part in a position wherein the opening in the flange of the holder is aligned with the connector hole in the structural member for insertion of the connector through the aligned openings to attach the first fastener part to the structural member.

12 Claims, 4 Drawing Sheets

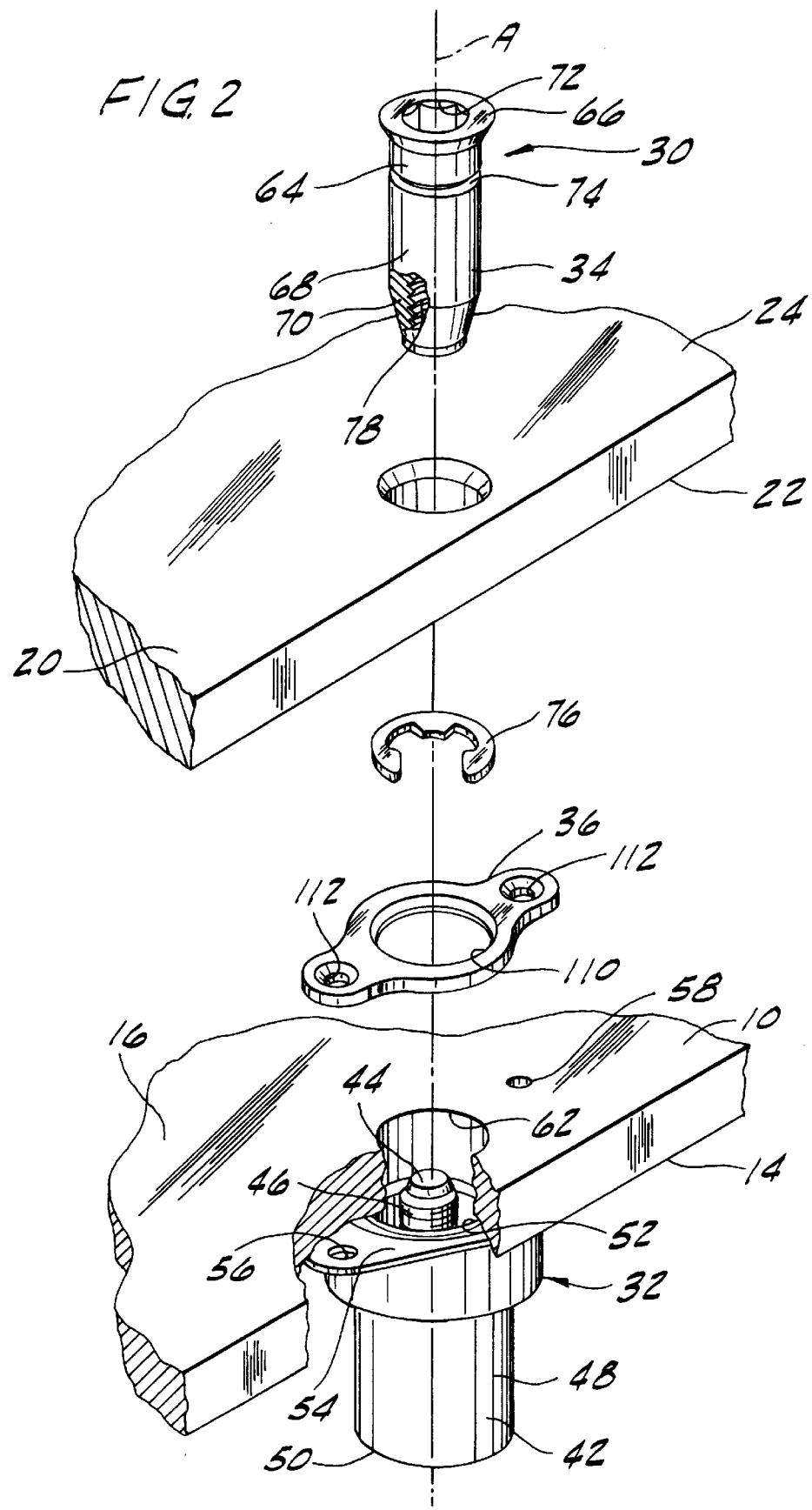

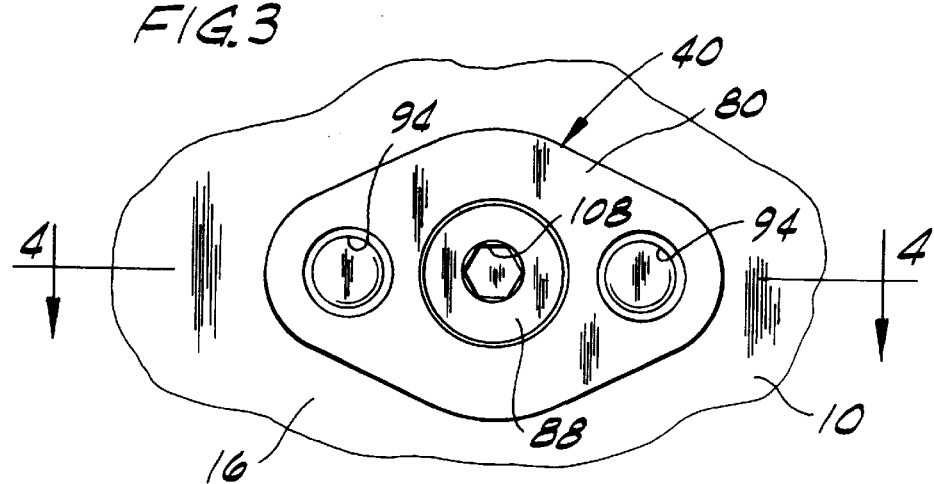
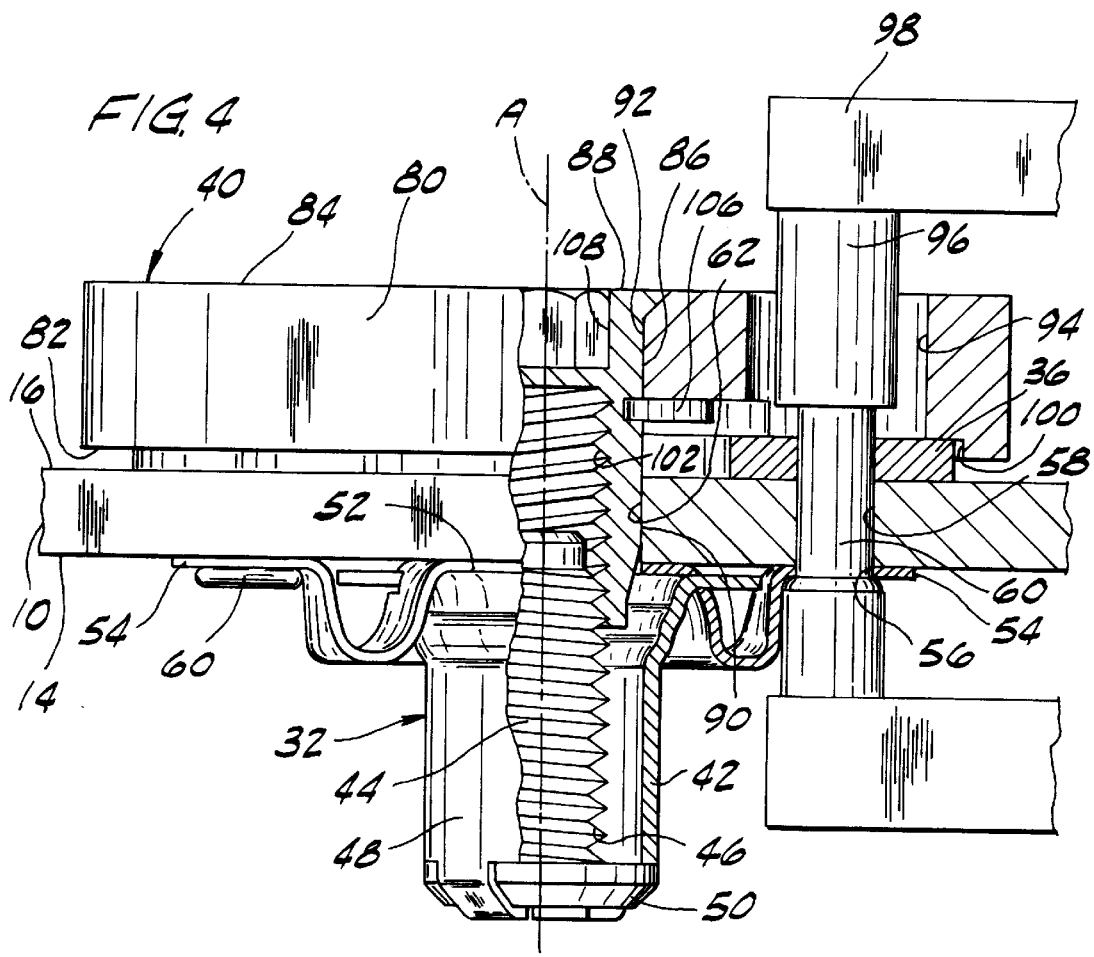

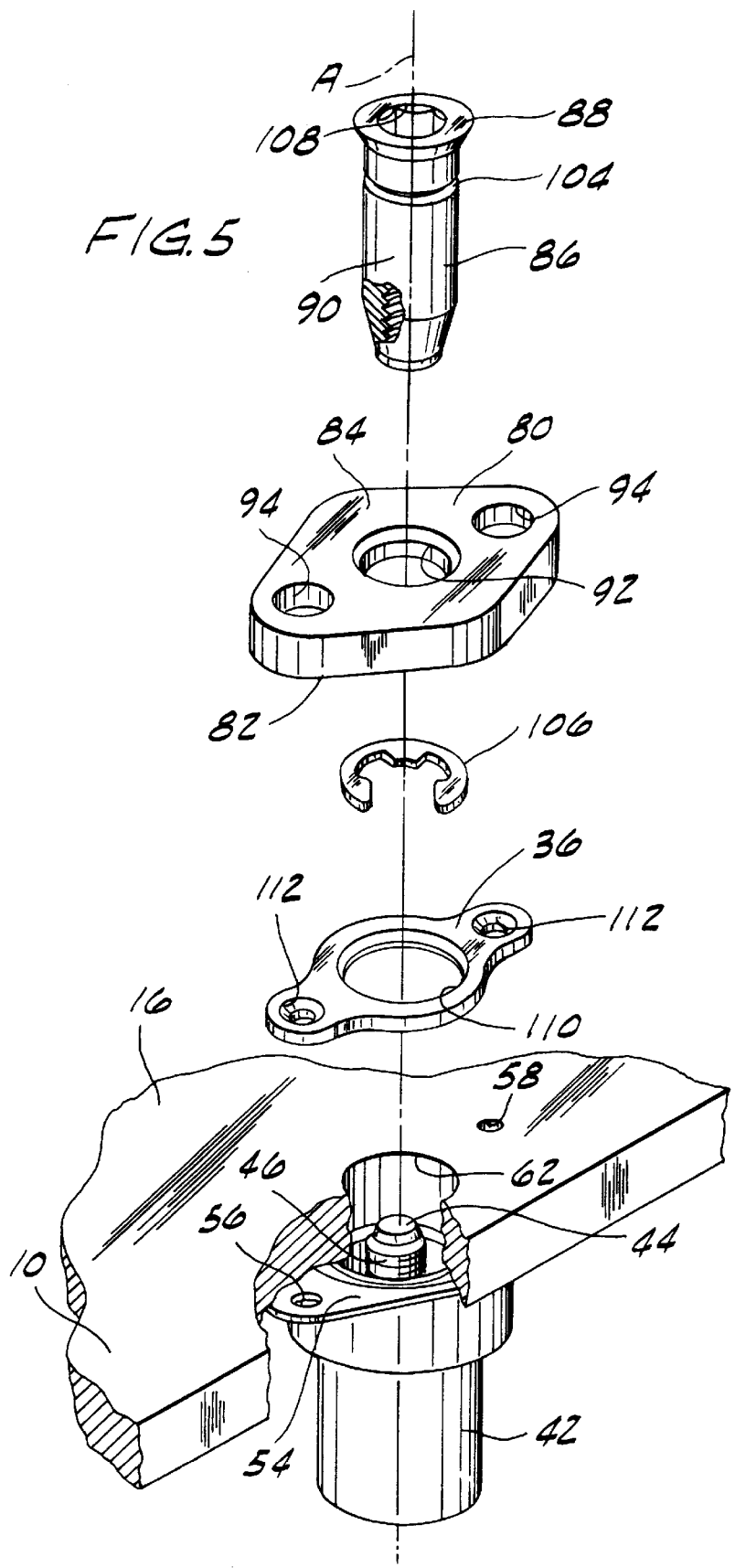

FASTENER INSTALLATION DEVICE

TECHNICAL FIELD

This invention relates generally to fasteners for connecting a panel to structure and more particularly to a device for use in attaching a part of the fastener to the structure.

BACKGROUND ART

Structural panels for use on aircraft, missiles and other structural bodies exposed to high loads are secured in place by fasteners capable of effectively transferring shear loads. The panels are typically removable to provide access to electronic, hydraulic or other components located within a compartment under the panel. Since a large number of fasteners are used to securely connect each panel to the structure, the fasteners must be quick-operating to allow for fast removal and replacement of the panel. The fasteners must also be able to withstand high vibration and stress. Thus, the fasteners must be securely attached to the structure to prevent loosening of the fasteners or possible failure of the fasteners.

Fasteners of this type are generally described in U.S. Pat. Nos. 4,324,517 and 5,399,053, which are incorporated herein by reference. A typical fastener comprises a holder which is permanently attached to an inner surface of the structure and a threaded stud retained in the holder. The fastener also includes a second part attached to the panel and cooperable with the threaded stud to pull the panel toward the mating structure and securely hold the panel in place. A shim is often placed at the location of the fastener, between an outer surface of the structure and an inner surface of the panel to account for any structural variations between the mating structure and panel. Two rivets are typically used to attach the holder and shim to the structure. To install a rivet, the shim and holder are generally held in place by a removable clamping device inserted into a first set of aligned openings in the holder, shim and structure. The rivet is then inserted into a second set of aligned openings and crimped by a rivet crimping tool. Since the clamping device holds the shim and holder at only one location, the shim and holder are prone to moving, which may result in the formation of a gap between the structure and the shim or the structure and the holder. Any such gap may prevent the rivet from being properly installed, thus increasing the chances of the fastener failing under high loads, and increasing fastener installation time due to rework of misinstalled fasteners.

Moreover, it is difficult to align a die of the rivet crimping tool properly over the rivet since there is no surrounding structure to align the die with the rivet. This makes installation of the rivets difficult and increases the time required to attach the fastener to the structure. Furthermore, if the die is not properly positioned over the rivet, the holder and shim may not be adequately attached to the structure, thus reducing the strength of the fastener.

Accordingly, there is presently a need for a device which is capable of holding the holder and shim securely in place against the structure while the rivets are installed to attach the holder and shim to the structure, and which provides a guide for positioning the rivet crimping tool over the rivets.

DISCLOSURE OF INVENTION

The present invention meets the above needs and overcomes the deficiencies of the prior art by providing a jig for holding a first part of a fastener assembly in tight engagement with a structure so that rivets (or other connectors) may be properly installed to securely attach the first fastener part to the structure. Among the features of the present invention may be noted the provision of a jig which provides simple and accurate alignment of a rivet crimping tool with a rivet for properly crimping the rivet to attach the first part of the fastener assembly to the structure. The present invention overcomes the limitations of the prior art and provides a jig which is economical to manufacture, simple to use, reduces rework due to misinstalled rivets, and significantly reduces the time required to install the first part of a fastener assembly to the structure.

Generally, a jig of the present invention is for use in attaching a first part of a fastener assembly to a structural frame member. The structural frame member has a fastener opening therein and at least one connector hole adjacent the fastener opening. The fastener assembly is of the type used for removably connecting a panel to the structural frame member. The panel has a second part of the fastener assembly attached thereto. The first part of the fastener assembly comprises a holder and a threaded stud retained in the holder. The holder has a flange at one end thereof having at least one opening formed therein. The holder is adapted for permanent attachment to an inner surface of the structural frame member by at least one connector extending through the connector hole of the frame member and the aligned opening in the flange of the holder. The jig comprises a body having inner and outer faces, and a rotatable member having a head rotatably mounted in the body and a shank projecting inwardly beyond the inner face of the body along an axis. The shank has threads thereon matingly engageable with the threads on the stud of the first fastener part. The body of the jig is adapted to be positioned with its inner face opposing an outer surface of the structural frame member and with the shank of the rotatable member extending inwardly through the fastener opening in the frame member for threaded engagement with the threaded stud of the first fastener part whereby rotation of the rotatable member of the jig is adapted to pull the holder of the first part of the fastener assembly into tight engagement with the inner surface of the structural frame member thereby to hold the first part of the fastener assembly in a position wherein the opening in the flange of the holder is aligned with the connector hole in the structural member for insertion of the connector through the aligned openings to attach the first part of the fastener assembly to the structural frame member. The jig is thereafter removable from the structural frame member.

A method of the present invention is for attaching a first part of a fastener assembly to a structural frame member having a fastener opening therein and at least one connector hole adjacent the fastener opening. The fastener assembly is of the type used to removably connect a panel to the structural frame member. The panel has a second part of the fastener assembly attached thereto. The first part of the fastener assembly comprises a holder, a threaded stud extending toward an open end of the holder, and a flange at the open end in the holder having at least one opening formed therein. The method includes placing the holder adjacent an inner surface of the structural frame member in a position wherein the opening in the flange is in alignment with the connector hole in the structural frame member. A jig is placed adjacent an outer surface of the structural frame member. The jig comprises a body and a rotatable member having a head rotatably mounted in the body and a shank extending inwardly beyond an inner surface of the body. The shank of the jig is threadably engaged with the threaded stud of the holder and the body is positioned to provide access to the connector hole in the structural frame member aligned with the opening in the flange of the holder. The shank of the rotatable member is rotated to pull the holder of the first fastener part tight against the inner surface of the structural frame member. A connector is inserted into the aligned connector hole and flange opening to attach the holder to the structural frame member. The jig is then removed from the structural frame member.

Other objects and features will be in part apparent and in part pointed out hereinafter.

BRIEF DESCRIPTION OF DRAWINGS

FIG. 2 an exploded view of the panel, structural member and fastener assembly of FIG. 1;

FIG. 3 is a stop view of a jig of the present invention;

FIG. 4 is partial cross-sectional view of the jig of FIG. 3 taken in the plane including line 4—4 of FIG. 3, attached to a first part of the fastener assembly and structural member;

FIG. 5 is an exploded view of the jig of FIG. 4, the first part of the fastener assembly and the structural member.

Corresponding reference characters indicate corresponding parts throughout the several views of the drawings.

BEST MODES FOR CARRYING OUT THE INVENTION

Figure 1:
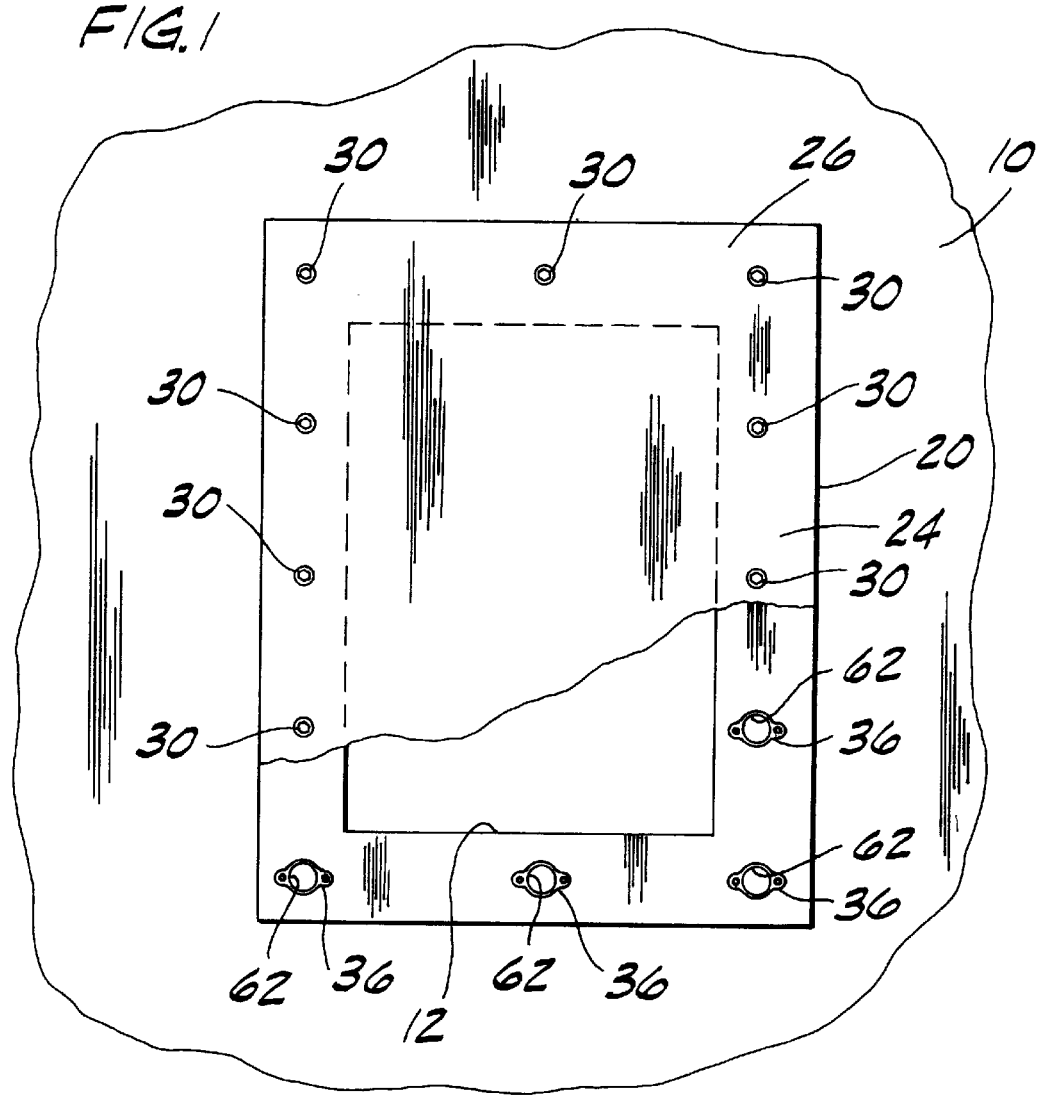
FIG. 1 is a top view of a panel connected to a structural frame member by a plurality of fastener assemblies.

Referring now to the drawings, and first to FIGS. 1 and 2, the reference numeral 10 is used to identify a structural frame member having an opening 12 therein, and inner and outer surfaces designated 14 and 16, respectively. The structural frame member 10 may be part of an airplane, missile or other structure, for example. A removable access panel 20 is provided for closing the opening 12. This panel 20 also has inner and outer surfaces 22, 24 and is sized somewhat larger than the opening 12 in the structural frame member 10 so that the peripheral edge margins 26 of the panel overlap the structural member around the opening. The panel 20 is removably attached to the structural frame member 10 by a plurality of two-part fastener assemblies spaced at intervals around the periphery of the panel, each assembly being indicated in its entirety by the reference numeral 30. As illustrated in FIG. 2, each fastener assembly 30 comprises a first fastener part, generally designated 32, permanently secured to the inner surface of the structural frame member, and a second fastener part, generally designated 34, attached to the panel 20. Shims 36 may be placed between the outer surface 16 of the structural member 10 and the inner surface 22 of the panel 20, at the location of each fastener assembly 30 to account for any structural variations between the mating structural member and panel (FIG. 1).

The present invention is directed to a special jig, generally indicated at 40 in FIGS. 3 and 4, for installing the fastener assemblies 30 described above, or similar fastener assemblies, as will be described in detail hereinafter. More specifically, the jig 40 is used to attach the first part 32 of the fastener assembly 30 to the structural frame member 10.

As best illustrated in FIG. 2, the fastener assembly 30 may be of the type generally known in the trade as a Milson fastener, available from SPS Technologies of Santa Ana, Calif., for example. The first part 32 of this fastener assembly 30 comprises a holder 42 and a stud 44 retained in the holder. The stud 44 has external threads 46 for mating with the second part 34 of the fastener assembly 30. The holder 42 is generally cup-shaped, having a cylindrical side wall 48, a closed end 50, an opposite open end 52, and a flange 54 extending radially outwardly from the open end. The flange 54 has two openings 56 for alignment with two connector holes 58 formed in the structural frame member 10 for receiving connectors 60 for permanently attaching the holder 42 to the inner surface 14 of the structural member (FIG. 4). The connectors 60 may be rivets or any other suitable fastening devices (e.g., nut and bolt fastener). The stud 44 is attached to the holder 42 at a location adjacent the closed end 50 of the holder and extends coaxially beyond the open end 52 of the holder. When the first part 32 of the fastener assembly 30 is placed adjacent the inner surface 14 of the structural frame member 10, the stud 44 extends into a fastener opening 62 formed in the structural member for mating with the second part 34 of the fastener assembly (FIG. 2).

The second part 34 of the fastener assembly 30 comprises an elongate fastener member 64 having a head 66 at a first end formed to abut the outer surface 24 of the panel 20 and a shank 68 having an axial bore 70 formed in an end opposite the head. The head 66 has a socket 72 shaped for receiving a tool such as an allen wrench (not shown) for tightening and loosening the first and second parts 32, 34 of the fastener assembly 30. The shank 68 has an external circumferential groove 74 for receiving a retaining ring 76 which retains the second part 34 of the fastener assembly 30 on the panel 20. The bore 70 has internal threads 78 for mating with the stud 44 of the first part 32 of the fastener assembly 30.

It is to be understood that the jig 40 of the present invention may be used with fastener assemblies 30 having configurations other than the one shown, and that the configuration of the structural frame member 10 and panel 20 may vary without departing from the scope of this invention. For example, the second part 34 of the fastener assembly 30 may have external threads for mating with internal threads on the first part 32 of the fastener assembly. The number of connector holes 58 in the structural frame member 10 and the number of openings 56 in the flange 54 of the holder 42 may also vary.

As shown in FIGS. 4 and 5, the jig 40 comprises a flat body 80 having inner and outer faces 82, 84, and a rotatable member 86. The rotatable member 86 has a head 88 rotatably mounted in a central opening 92 the body, and a shank 90 projecting inwardly beyond the inner face 82 of the body 80 along an axis A. The body 80 of the jig 40 also has two guide holes 94 located on opposite sides of the central opening 92 for providing access to the two connector holes 58 in the structural frame member 10 and aligned openings 56 in the flange 54 of the holder 42. Each guide hole 94 is sized for receiving a die 96 of a rivet crimping tool 98 to provide a guide for properly positioning the die over the rivet 60 and a respective connector hole 58. The guide hole 94 may have a diameter greater than about 0.20 in. (0.51 cm), for example, for receiving the die 96 of a crimping tool 98 having a diameter of less than 0.20 in. (0.51 cm). The body 80 may also be formed with one hole, more than two holes or have no holes and be shaped such that the body does not cover the connector holes 58 in the structural member 10 to provide access to the connector holes for insertion of the rivets 60.

Figure 6:
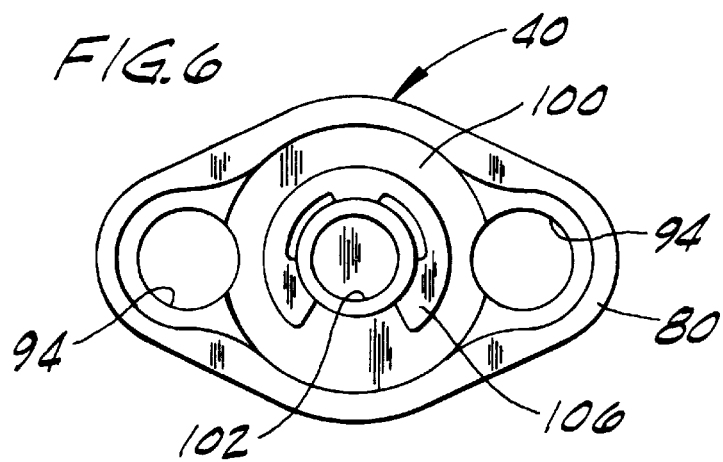
FIG. 6 is a bottom view of the jig of FIG. 1.

As best shown in FIG. 6, the inner surface 82 of the body 80 has a recess 100 for receiving a shim 36 located on the outer surface 16 of the structural frame member 10 so that the body 80 is easily positioned with reference to the shim which may be glued in place to the structural frame member prior to installing the jig 40. The shape of the body 80 may vary, but the body is preferably configured to have a length and width which provide an area sufficient to hold the shim 36 in engagement with the outer surface 16 of the structural frame member 10. The body 80 may, for example, have a shape generally conforming to the shape of the shim 36 (see FIG. 3). The distance between the inner and outer faces 82, 84 (thickness) of the body 80 is preferably large enough to provide an adequate guide for the rivet crimping tool die 96 (FIG. 4). The body 80 should also be thick enough to prevent deformation of the body by forces exerted on the body by the head 88 of the rotatable member 86 as the rotatable member is threadably engaged with the stud 44 of the first fastener part 32. The thickness of the body 80 may be about 0.20 in. (0.51 cm), for example.

The shank 90 of the rotatable member 86 has an internally threaded bore 102 for mating with the external threads 46 on the stud 44 of the first fastener part 32. The shank 90 preferably has a length greater than the combined thickness of the body 80 and the structural frame member 10 so that the shank extends beyond the inner surface 14 of the structural member for threaded engagement with the stud 44 of the first fastener part 32. The shank 90 has an external circumferential groove 104 for receiving a retaining ring 106 for rotatably retaining the head 88 of the rotatable member 86 in the body 80 of the jig 40 (FIG. 5). The groove 104 is spaced from the head 88 a distance which is slightly greater than the thickness of the body 80 so that the retaining ring 106 allows for free rotation of the rotatable member 86 but does not allow a significant amount of axial movement of the rotatable member along axis A, relative to the body. The head 88 of the rotatable member 86 has a socket 108 formed therein for receiving a tool such as an allen wrench for rotating the shank 90 of the rotatable member 86 on the axis A. The jig 40 may be formed by inserting the second part 34 of a fastener assembly 30 into the central opening 92 in the body 80. The second fastener part 34 would then constitute the rotatable member 86.

The body 80 and shank 90 of the jig 40 are preferably formed from metal but may be formed from other suitable materials. It is to be understood that the rotatable member 86 may have configurations other than the one shown without departing from the scope of the invention. For example, the shank 90 may have external threads for mating with internal threads on the stud of the first part of a fastener assembly.

To use the jig 40 of this invention to attach the first part 32 of the fastener assembly 30 to the structural frame member 10, the first fastener part is placed adjacent the inner surface 14 of the structural frame member in a position wherein the openings 56 in the flange 54 of the holder 42 are in alignment with the connector holes 58 in the structural frame member 10 and the rotatable member 86 extends into the fastener opening 62 of the structural member (FIG. 5). A shim 36 is placed on the outer surface 16 of the structural frame member 10 and positioned so that a central opening 110 in the shim is aligned with the fastener opening 62 in the structural member and shim openings 112 located next to the central opening are aligned with the connector holes 58 in the structural member. The body 80 of the jig 40 is positioned with its inner face 82 opposing the outer surface 16 of the structural frame member 10 with the shank 90 of the rotatable member 86 extending inwardly through the fastener opening 62 of the structural member for threaded engagement with the stud 44 of the first fastener part 32 (FIG. 4). The body 80 of the jig 40 is then positioned to align the guide holes 94 of the jig with the connector holes 58 in the structural member 10.

The shank 90 of the jig 40 is threadably engaged with the stud 44 of the first fastener part 32 and an allen wrench is inserted into the socket 108 in the head 88 of the rotatable member 86 to rotate the shank 90 of the rotatable member. Rotation of the rotatable member 86 pulls the holder 42 of the first part 32 of the fastener assembly 30 into tight engagement with the inner surface 14 of the structural frame member 10 thereby to hold the first fastener part in a fixed position wherein the openings 56 in the flange 54 of the holder 42 are aligned with the connector holes 58 in the structural member. Rivets 60 are then inserted into the aligned guide holes 94, connector holes 58 and flange openings 56, and the die 96 of the rivet crimping tool 98 is inserted into each guide hole to crimp the rivets and attach the holder 42 and shim 36 to the structural frame member 10. Following installation of the rivets, the jig 40 is removed from the structural member 10 by rotating the shank 90 of the rotatable member 86 to disengage the rotatable member of the jig from the stud 44 of the first fastener part 32. The first fastener part 32 is then ready for engagement with the second fastener part 34 for connecting the panel 20 to the structural member 10. The jig 40 may be used to install any number of first fastener parts 32 to the same structural member 10 or to a different structural member.

It will be observed from the foregoing that the jig 40 has numerous advantages over the prior art. Importantly, the jig 40 securely holds the shim 36 and first fastener part 32 in tight engagement with the structural frame member 10 to prevent the formation of gaps between the structural member and the shim or the structural member and the first fastener part so that the first fastener part may be properly installed. Furthermore, the guide holes 94 provide for simple and accurate alignment of the rivet crimping tool 98 with the rivets 60, thus reducing the time required to install the fastener assemblies 30.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A jig for use in attaching a first part of a fastener assembly to a structural frame member configured to permanently receive a first part of the fastener assembly, said structural frame member having a fastener opening therein and at least one connector hole adjacent the fastener opening, the fastener assembly being of the type used for removably connecting a panel to the structural frame member, said panel having a second part of the fastener assembly attached thereto, the first part of the fastener assembly comprising a holder and a threaded stud retained in the holder, the holder having a flange at one end thereof having at least one opening formed therein, the holder being adapted for permanent attachment to an inner surface of the structural frame member by at least one connector extending through said connector hole of the frame member and the aligned opening in the flange of the holder, the jig comprising a body having inner and outer faces, and a rotatable member having a head rotatably mounted in the body and a shank projecting inwardly beyond the inner face of the body along an axis, said shank having threads thereon matingly engageable with the threads on the stud of the first fastener part, the body of the jig being adapted to be temporarily positioned with its inner face opposing an outer surface of the structural frame member and with the shank of the rotatable member extending inwardly through the fastener opening in the frame member for threaded engagement with said threaded stud of the first fastener part whereby rotation of the rotatable member of the jig is adapted to pull the holder of the first part of the fastener into tight engagement with the inner surface of the structural frame member thereby to hold the first part of the fastener assembly in a permanently installed position wherein the opening in the flange of the holder is aligned with the connector hole in the structural member for insertion of said connector through the aligned openings to attach the first part of the fastener assembly to the structural frame member, the jig having a hole aligned with the connector hole and of larger diameter than the connector hole for receiving a die therein in engagement with the connector, the jig thereafter being removable from the structural frame member.

2. A jig as set forth in claim 1 comprising two guide holes in the body located for alignment with two connector holes in the frame member and two openings in the flange of the holder.

3. A jig as set forth in claim 2 wherein each guide hole has a diameter greater than 0.20 in.

4. A jig as set forth in claim 1 wherein the shank of the rotatable member has an internally threaded bore adapted to mate with external threads on said stud of the first fastener part.

5. A jig as set forth in claim 1 wherein the head of the rotatable member has a socket therein for receiving a tool for rotating the shank of the rotatable member on said axis.

6. A jig as set forth in claim 1 wherein the distance between said inner and outer faces, corresponding to the thickness of the body, is greater than 0.20 in.

7. A jig as set forth in claim 1 wherein said structural frame member has a shim on the outer surface thereof and said body has a recess formed in its inner face for receiving said shim.

8. A jig as set forth in claim 1 further comprising a retaining ring for retaining the head of the rotatable member rotatably mounted in the body of the jig, and wherein said shank has a circumferential groove for receiving said retaining ring.

9. A jig as set forth in claim 1 wherein said body and shank are formed from metal.

10. A method of attaching a first part of a fastener assembly to a structural frame member having a fastener opening therein and at least one connector hole adjacent the fastener opening, the fastener assembly being of the type used to removably connect a panel to the structural frame member, said panel having a second part of the fastener assembly attached thereto, the first part of the fastener assembly comprising a holder, a threaded stud extending toward an open end of the holder, and a flange at the open end in the holder having at least one opening formed therein, the method comprising:

placing the holder adjacent an inner surface of the structural frame member in a position wherein said opening in the flange is in alignment with the connector hole in the structural frame member;

placing a jig adjacent an outer surface of the structural frame member, the jig comprising a body having at least one guide hole therein of larger diameter than the connector hole and a rotatable member having a head rotatably mounted in the body and a shank extending inwardly beyond an inner surface of the body;

threadably engaging the shank of the jig and the threaded stud of the holder and positioning the body to provide access for a die to the connector hole through the at least one guide hole in the structural frame member aligned with the opening in the flange of the holder;

rotating the shank of the rotatable member to pull the holder of the first fastener part tight against the inner surface of the structural frame member;

inserting a connector into the aligned connector hole and flange opening;

inserting said die in said guide hole in engagement with said connector to attach the holder to the structural frame member; and removing the jig from the structural frame member.

11. A method as set forth in claim 10 wherein the step of rotating the shank of the rotatable member includes inserting an allen wrench into a socket in the head of said rotatable member, and then turning the allen wrench to rotate the rotatable member.

12. A method as set forth in claim 10 further comprising the step of inserting a shim between the structural frame member and the body of the jig before placing the jig adjacent the outer surface of the structural member.

* * * * *